US012612277B2

(12) United States Patent
Urrutia Nebreda et al.

(10) Patent No.: US 12,612,277 B2
(45) Date of Patent: Apr. 28, 2026

(54) PRINTING TO SUBSTRATES

(71) Applicant: Hewlett-Packard Development Company, L.P., Spring, TX (US)

(72) Inventors: Martin Urrutia Nebreda, Sant Cugat del Valles (ES); Joan Marti Velasco Figueras, Sant Cugat del Valles (ES); Jorge Porras Martinez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 222 days.

(21) Appl. No.: 18/573,465

(22) PCT Filed: Jun. 22, 2021

(86) PCT No.: PCT/US2021/038514
§ 371 (c)(1),
(2) Date: Dec. 22, 2023

(87) PCT Pub. No.: WO2022/271158
PCT Pub. Date: Dec. 29, 2022

(65) Prior Publication Data

US 2024/0286859 A1 Aug. 29, 2024

(51) Int. Cl.
*B65H 18/14* (2006.01)
*B41J 3/60* (2006.01)

(52) U.S. Cl.
CPC .............. *B65H 18/145* (2013.01); *B41J 3/60* (2013.01)

(58) Field of Classification Search
CPC .... B65H 18/145; B65H 2403/942; B41J 3/60; B41J 15/04
See application file for complete search history.

(56) References Cited

U.S. PATENT DOCUMENTS

| | | | | |
|---|---|---|---|---|
| 5,042,788 | A | 8/1991 | Bowman et al. | |
| 8,371,672 | B2 * | 2/2013 | Kusakabe | B41J 29/393 347/14 |
| 9,061,529 | B2 | 6/2015 | Fuchioka et al. | |
| 2011/0261131 | A1 | 10/2011 | Eve et al. | |
| 2020/0079104 | A1 * | 3/2020 | Shigeta | B41J 15/04 |

FOREIGN PATENT DOCUMENTS

| | | | |
|---|---|---|---|
| EP | 2338816 | A2 | 6/2011 |

* cited by examiner

*Primary Examiner* — Ricardo I Magallanes
*Assistant Examiner* — Tracey M Mcmillion
(74) *Attorney, Agent, or Firm* — Jordan IP Law, LLC

(57) ABSTRACT

According to an example, a method comprises unwinding a print media from an input roller toward a printing station. The printed print media is wound onto an output roller. The printed print media is unwound from the output roller toward the printing station.

14 Claims, 4 Drawing Sheets

PRINTING TO SUBSTRATES

BACKGROUND

In some printing operations an image is formed onto a substrate through the deposition of printing fluid onto the substrate at a printing station.

BRIEF DESCRIPTION OF DRAWINGS

Examples will now be described, by way of non-limiting example, with reference to the accompanying drawings, in which.

DETAILED DESCRIPTION

Figure 1:
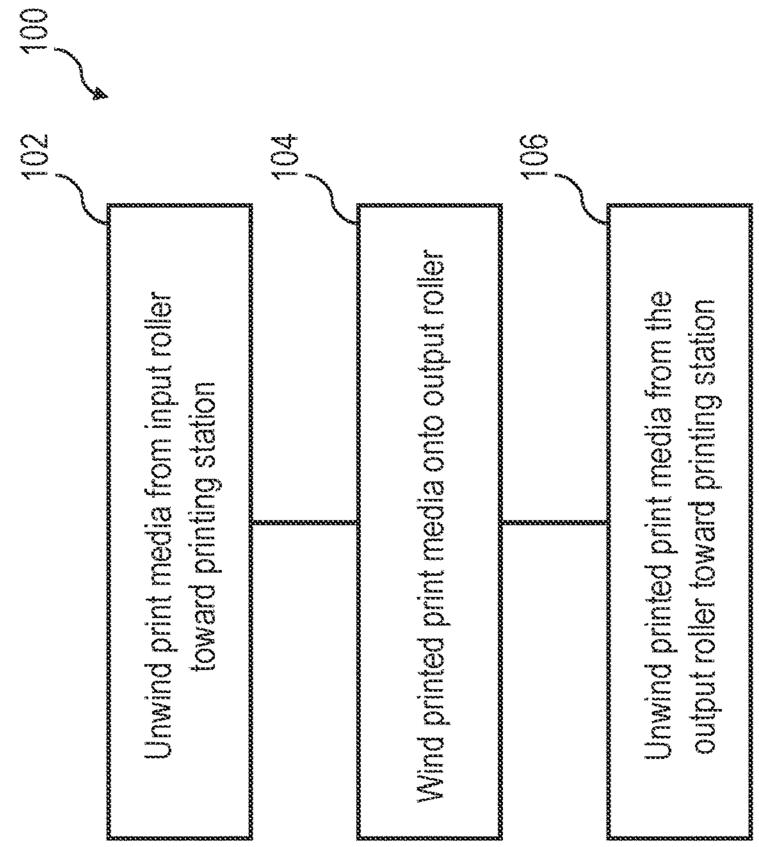
FIG. 1 is a flowchart of an example method.

Some examples herein relate to a system and device for feeding a substrate to, and receiving a substrate from, a print engine for an image to be formed thereon by the selective deposition of printing fluid at the print engine. The examples herein relate to a system and device having first and second rollers. Each one of the rollers is to receive, or hold, a substrate (or print media). For example, the rollers may be to receive a substrate therearound by virtue of the substrate being wound around the substrate. In such examples, the or each roller may be rotatable in first and second directions, where rotation in the first direction causes a substrate, wound around the roller, to advance from the roller (e.g. rotation in a first direction lets loose the substrate from the roller) and where rotation in the second direction causes a substrate to be taken up by, or wound around, the roller. Rotation in the first direction may therefore be to advance the substrate, e.g. toward a print engine for printing thereto, and rotation in the second direction may therefore cause a substrate to be taken up by the roller.

Some examples herein relate to a first roller and a second roller, wherein then first roller is to advance a substrate toward a print engine for printing thereto, and wherein the second roller is to receive the printed substrate from the print engine (e.g. the substrate having an image deposited thereon at the print engine), e.g. by rotating to wind the printed substrate around the roller. Then, the second roller is to advance the printed substrate back toward the print engine for subsequent printing thereto, e.g. by rotating to unwind, and advance, the substrate toward the print engine again. In this way, a single automatic operation may cause two separate images to be deposited onto the same substrate. This may be done at two different printing stations, or by two different print engines, or may be done at the same printing station, or by the same print engine. An opposite edge of the substrate may be fed toward the print engine by the second roller than by the first roller, e.g. the leading edge of the substrate fed by the second roller toward the print engine may be the trailing edge of the substrate when it was fed by the first roller toward the print engine and received by the second roller from the first roller, via the print engine. In some examples, the second roller may rotate in an opposite direction to advance the substrate than its rotating direction when it receives the substrate, and the second roller may receive the printed substrate, from the first roller via the print engine, such that the printed side (or face) of the substrate faces inwards, or toward the center of the second roller. In these examples, the second roller may be to feed the printed substrate toward the same print engine for an image to be deposited on the other (non-printed) side (or face) of the substrate. In other words, some examples herein relate to an automatic method of dual-sided printing, e.g. with no, or minimal, user intervention since the second roller, which is used as the output roller (or take-up roller) in a first print operation receiving the printed substrate, is then used as the input roller in a subsequent print operation to feed the printed substrate toward the print engine for subsequent printing thereto. The automatic nature of this process reduces or eliminates any need to physically load and unload the rollers into a media device, which, if not done properly, can cause errors such as skew-printing (e.g. resulting from the substrate becoming telescopically wound around a roller and hence unaligned), which in-turn can result in poor print quality, particularly for dual-sided printing where both sides of the image and substrate are to match.

FIG. 1 shows an example method 100 which may comprise a computer-implemented method. The method 100 may comprise a method of printing an image to a print media (e.g. by virtue of the deposition of printing fluid thereon).

At block 102 the method comprises unwinding a print media from an input roller toward a printing station. The print media may be wound around the input roller and block 102 may comprise causing the input roller to rotate in a first direction to advance, or let loose, the print media from the input roller. Block 102 may comprise advancing a first edge, e.g. a leading edge, of the print media toward the printing station. Block 102 may be performed by a processor or a controller, e.g. which causes the input roller to rotate to advance the substrate.

At block 104 the method comprises winding the printed print media onto an output roller. Block 104 may comprise receiving the printed print media from the printing station (e.g. the printing station toward which the print media was advanced at block 102). Block 104 may therefore comprise receiving the printed print media from the first roller, via the printing station, having an image deposited thereon. Block 104 may comprise receiving the first edge, e.g. the leading edge, of the print media at the output roller and winding the remainder of the print media therearound. After block 104, the printed print media may be wound around the output roller such that the first, leading edge, is proximate a center of the output roller and a second, trailing, edge of the print media is remote from the center relative to the first edge, e.g. disposed on an outer surface of the print media wound around the output roller. Block 104 may comprise rotating the output roller in a first direction to receive the printed print media. Block 104 may be performed by a processor or a controller, e.g. which causes the output roller to rotate in the first direction.

At block 106 the method comprises unwinding the printed print media from the output roller toward the printing station. Block 106 may comprise advancing the second edge toward the print station. In other words, the second edge, which was the trailing edge in the parts of the method described at blocks 102 and 104 is the leading edge of the media at block 106. At block 106, the output roller is therefore effectively used as the input roller in a subsequent print operation. Block 106 may comprise rotating the output roller in a second direction to advance the printed print media. Block 106 may be performed by a processor or a controller, e.g. which causes the output roller to rotate in the second direction.

Therefore, at block 102, a print media is advanced toward a printing station where an image is to be printed thereon and, at block 104, the printed print media is received and wound around an output roller. Then, at block 106, the output roller advances the printed print media toward the printing station so that a further image can be printed thereto. In other words, the method 100 facilitates the automatic printing of multiple images to a print media by using the output roller that received printed print media as the input roller to advance the printed print media toward the printing station again for a subsequent print operation.

In some examples, the print media is advanced from the input roller toward the printing station, at block 102, such that a first side (or first face) of the print media is to be printed on. For example, block 102 may comprise advancing the print media toward the printing station such that the first side faces upwards (and faces downwardly-facing nozzles of the printing station that are to discharge printing fluid). Block 104 may therefore comprise receiving the printed print media having an image deposited on a first side thereon. Block 106 may comprise advancing the print media toward the printing station such that the first side (e.g. the same side) of the print media is to be printed on. In this way, an inked image can by "built up" from subsequently deposited layers of printing fluid. In other examples however, block 106 may comprise advancing the print media toward the printing station such that a second side (or face), the second side being opposite to the first or the other side of the print media, is to be printed on. In this way, the method 100 can comprise a method of dual-sided printing. In these latter examples, block 104 may comprise winding the printed print media onto the output roller such that the first side (the printed side, or side having the image formed thereon) faces inwards, or towards the center of the output roller. Then, if the output roller is caused to rotate in an opposite direction to advance the printed print media than the direction it rotated to receive the printed print media, the printed print media is advanced toward the printing station such that the second side faces upwards to be printed on.

The direction of the output roller may, in some examples, depend on whether the same side, or a different side, of the printed print media is to be subsequently printed to. For example, if block 104 comprises rotating the output roller in a first direction to receive the printed print media then block 106 may comprise rotating the output roller in the first direction, or in the second direction, depending on the example. To advance the print media from the first and/or second roller, a loader, or threading module, may be caused (e.g. under the control of a processor or controller) to load an edge of the print media from a roller into a print media path, the print media path advancing into, or through, the printing station. The loader, or threading module (to be described later) may comprise a roller to contact the print media. The roller may be passive or active (e.g. may be driven, e.g. under the control of a processor or controller, such that it is caused to rotate, or may be freely-rotating).

After block 106 is performed, the method may comprise cutting the print media or unloading the print media. In these examples, the printed print media may be taken away to be used or for post-processing. However, the method may also comprise storing the printed print media in which example, following block 106, the method may comprise winding the printed print media around the input roller. In other words, following block 106, the method may comprise receiving the printed print media (having been printed on twice, either on the same side or on different sides in dual-sided printing examples) around the (original) input roller which now functions as an output roller. Then, the method 100 could be repeated by causing the input roller having the printed print media thereon to rotate and advance the print media again to the printing station (for printing to the print media a third time), the blocks of the method being repeated to build up an image on a side, or sides, of the print media.

If block 102 comprises causing the input roller to rotate in a first direction to advance the print media then the method may comprise causing the input roller to rotate in a second direction to receive the printed print media, or in the first direction depending on the example. The printed print media in these examples received at the input roller comprises the print media advanced by the output roller through the printing station and, therefore, the method may comprise receiving by the input roller the printed print media from the output roller via the printing station, e.g. and winding the printed print media around the input roller. Then, the input roller having the printed print media (e.g. dual-sided) wound therearound may be unloaded so that a user can collect the print job.

Blocks 102 and 106 may comprise advancing the print media toward or along a print media path, the print media path leading toward and/or through the printing station, and blocks 102 and 106 may comprise advancing the print media along the same print media path. A loader or threader (e.g. a loading or threading mechanism) may cause the print media to unwind from the or each roller and advance on the print media path.

Figure 2:
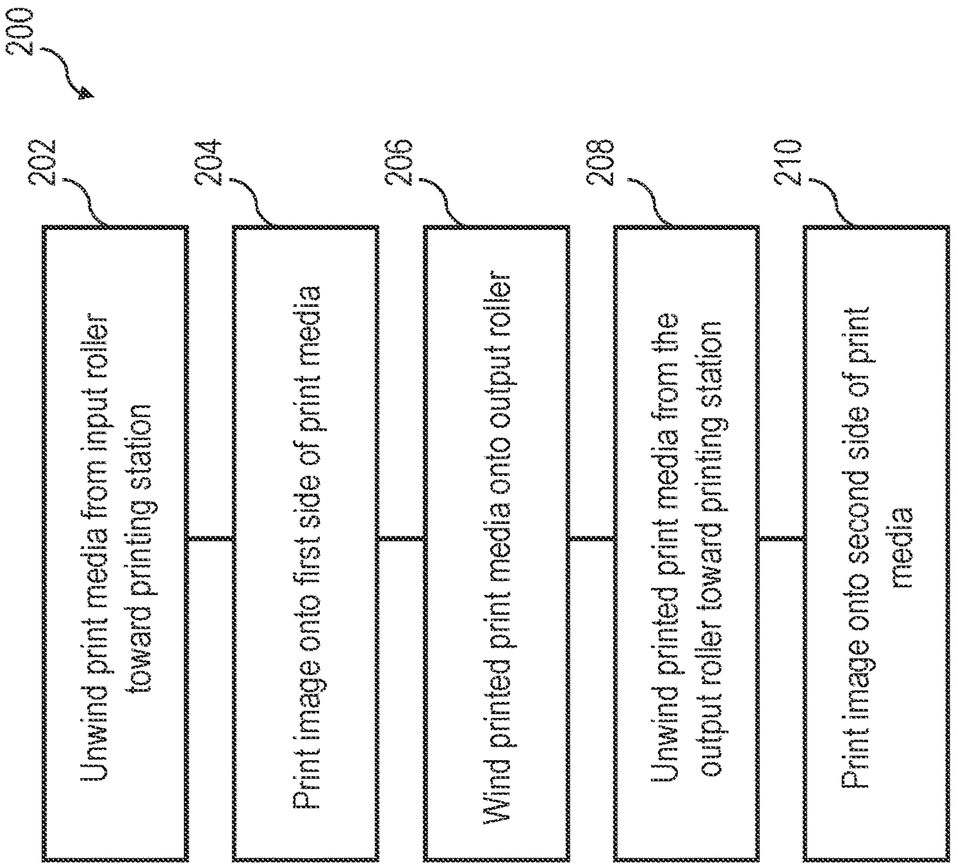
FIG. 2 is a flowchart of an example method.

FIG. 2 shows an example method 200 which may comprise a computer-implemented method. The method 200 may comprise a method of printing an image to a print media (e.g. by virtue of the deposition of printing fluid thereon), and may comprise the method 100 as described with reference to FIG. 1. The method of FIG. 2 comprises a method of dual-sided printing in which an image may be printed onto first and second sides of a print media.

At block 202 the method comprises unwinding a print media from an input roller toward a printing station. The print media has first and second opposite, or opposing, sides. Block 202 may comprise block 102 as described with reference to FIG. 1. At block 204 the method comprises printing an image onto the first side of the print media at the printing station. As stated above with respect to the method 100, the method 200 may comprise advancing the print media from the input roller such that the first side is to be printed on, e.g. such that the first side will face the printing station.

At block 206 the method comprises winding the printed print media onto an output roller. Block 206 may comprise block 104 as described with reference to FIG. 1. Block 206 may therefore comprise collecting the print media having been printed thereto. Block 206 may comprise winding the printed print media onto the output roller such that the first side of the print media (the side that was printed to at block 204) faces toward from the center of the output roller and the second side of the print media (the side that was not printed to) faces away from the center of the output roller.

At block 208 the method comprises unwinding the printed media from the output roller toward the printing station. Block 208 may comprise block 106 as described with reference to FIG. 1. As stated above, the edge of the print media that is advanced toward the printing station at block 208 may be an opposite edge of the print media to the edge that was advanced at block 202. In other words, the leading edge of the media during the part of the method described by block 208 may comprise the trailing edge of the media during the part of the method described by block 202, such that the leading edge of block 202 becomes the trailing edge of block 208 and that the trailing edge of block 202 becomes the leading edge of block 208. Winding the printed print media onto the output roller, at block 206, may comprise rotating the output roller in a first direction, and unwinding, at block 208, the printed print media from the output roller toward the printing station may comprise rotating the output roller in a second direction to feed the second, opposite (and unprinted) side of the print media toward the printed station to achieve the dual-sided printing.

At block 210 the method comprises printing an image onto the second side of the print media at the printing station. As stated above, in the FIG. 2 method, each time the print media advances through the printing station, the printing station deposits printing fluid onto a different side of the print media. Therefore, blocks 204 and 210 respectively comprise printing an image to a different side of the print media.

Figure 3:
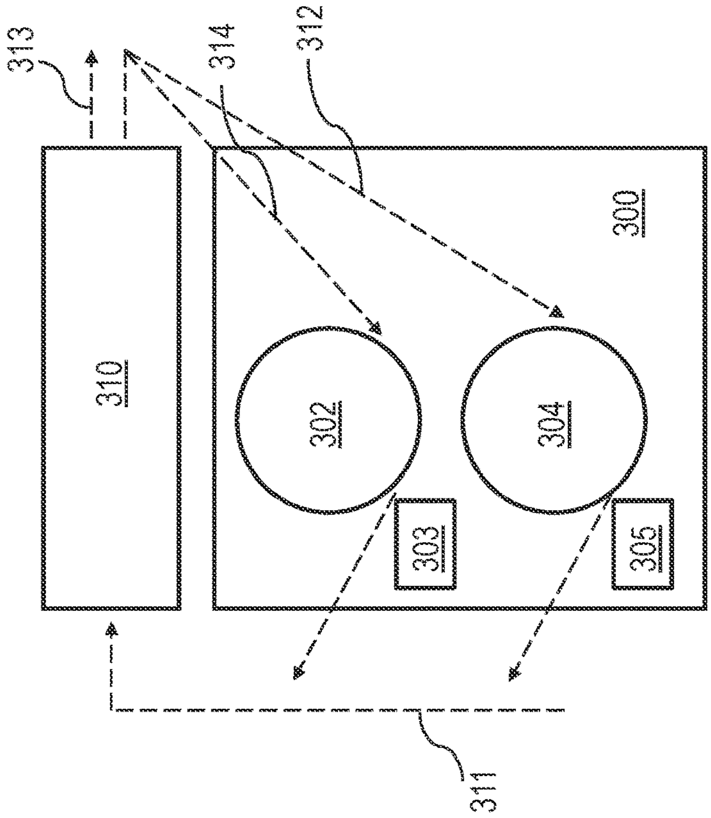
FIG. 3 is a simplified schematic of an example printing system.

FIG. 3 shows an example printing system 300. The printing system 300 comprises a first roller 302 to receive a print media and a first loader 303 to load a first edge of the print media from the first roller 302 into a print path to advance the print media along the print path toward a print engine, schematically denoted by 310. The printing system 300 comprises a second roller 304 to receive print media from the print engine 310 and a second loader 305 to load a second edge of the print media from the second roller 304 into the print path to advance the print media along the print path 314 toward the print engine 310. The printing system 300 may be to perform the method of FIG. 1 and/or the method of FIG. 2 (e.g. any of the blocks thereof). The printing system 300 in this example does not comprise the print engine 310 but, in some examples, the printing system 300 may comprise the print engine 310. As shown in FIG. 3, in some examples the first roller 302 may be disposed closer to a top of the printing system 300 than the second roller 304, and/or may be disposed closer to the print engine 310 than the second roller 304, but, in other examples, this may be different.

As stated above, each of the first and second rollers 302, 304 are to load an edge of the print media into a print path. A portion of the print path is indicated schematically by the dotted line 311. As shown by 311, the print path is toward and/or through the print engine 310. As stated above, the first loader 303 is to load a first edge of the print media from the first roller 302 into the print path 311 to advance the print media along the print path 311 toward the print engine 310. Thereafter, as indicated by the dotted line 312, the printed print media (e.g. the print media from the print engine 310) is received at the second roller 304. The second loader 305 is to load a second edge of the print media from the second roller 304 into the same print path 311 so that the print media can be again advanced along the print path toward the print engine 310 for subsequent printing thereto. As indicated by the line 313, after subsequent printing the print media may be collected or, as indicated by the line 314, may be received at the first roller 302 (e.g. wound around the first roller 302), e.g. for storage and/or unloading as rolled print media.

As described above, the first and second rollers 302, 304 may be rotatable, and the second roller 304 may be rotatable in two opposing directions. The second roller 304 may be to rotate in a first direction to receive print media (e.g. from the printing station) and in a second direction for the second loader 305 to advance the second edge of the print media into the print path 311. The first and second edges of the print media may be opposing edges. The edge to be loaded by the respective loader 303, 305 may be disposed on the respective roller 302, 304 remote from the center, or on an outside surface of the roller 302, 304. The second edge, loaded by the second loader 305 may be the trailing edge of the print media if the first edge, loaded by the first loader 303 was considered to be the leading edge. Therefore, the first loader 303 may be to load a leading edge of the media into the print path 311 and the second loader 305 may be to load the trailing edge of the media into the print path 311. The first loader 303 may be to load the first edge into the print path such that a first side of the print media faces a first direction and the second loader 305 may be to load the second edge into the print path such that the second side of the print media faces the first direction, so that an image is printed to the other, opposite, side of the print media for dual sided printing. As stated above, for some examples of dual-sided printing, the second roller 304 may be to receive the print media from the print engine 310 (e.g. printed print media having printing fluid deposited thereon, e.g. onto a first side thereof), such that the printed side (e.g. the first side) of the print media faces toward the center of the second roller 304. The first and/or second loaders 303, 305 may each comprise a roller to contact the print media to advance the print media. This will be described with reference to FIGS. 5 and 6 but, the roller may be an active roller (e.g. a driven roller) that may be caused to rotate (e.g. under the control of a motor) or a passive (e.g. freely-rotating) roller. In some examples the or each loader 303, 305 may comprise other than a roller.

Figure 4:
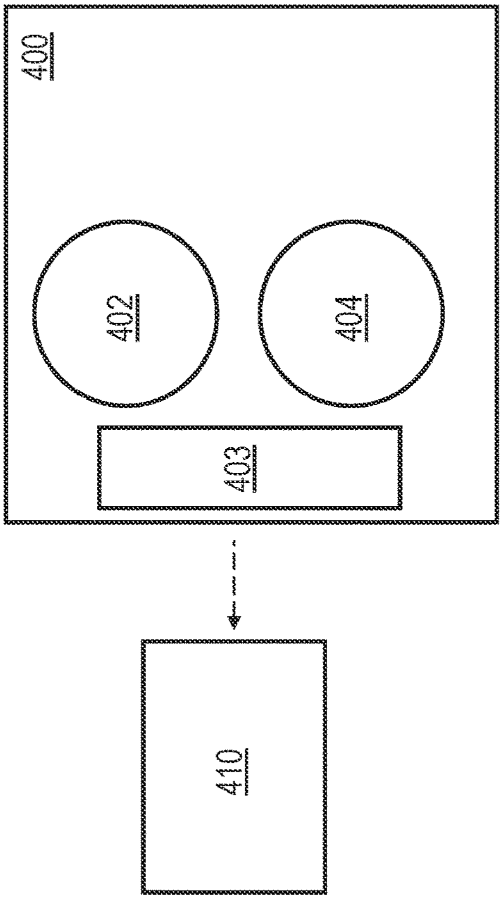
FIG. 4 is a simplified schematic of an example media handling device.

FIG. 4 shows an example media handling device 400. The media handling device 400 comprises first and second rollers 402, 404 provided on the same side of the media handing device 400. Each of the first and second rollers 402, 404 is to receive a substrate and the second roller 404 is additionally to receive a substrate from the first roller 402. The media handling device 400 comprises a threading module, schematically illustrated at 403. The threading module 403 is to load an edge of the substrate disposed on the first and second rollers 402, 404 toward a print engine, schematically indicated at 410. Specifically, the threading module is to load a first edge of the substrate from the first roller 402 toward the print engine 410, and a second, opposite, edge of the substrate from the second roller 404 toward the print engine 410. The media handling device 400 may be to perform the method of FIG. 1 and/or the method of FIG. 2 (e.g. any of the blocks thereof).

The media handling device 400 may be used in conjunction with, or as part of, a printing system or a print apparatus. For example, the media handling device 400 may be used to feed a substrate toward, and receive a substrate from, a print engine, which may or may not be a part of the media handling device 400. Therefore, as shown in FIG. 4, the print engine 410 may be a separate component to the media handling device 400 and the media handling device 400 may be disposed such that it feeds the substrate to, and receives the substrate from, the external print engine 410.

The first and second rollers 402, 404 are provided on the same side 401 of the media handing device 400. The side 401 may comprise a front of the media handling device 400. In any example, that the first and second rollers 402, 404 are provided on the same side 401 of the media handling device 400 facilitates ease of loading and unloading the rollers, e.g. to remove printed substrate from the media handling device 400 or to load new substrate into the media handling device 400. As shown in FIG. 4, in some examples the first roller

402 may be disposed closer to a top of the media handling device 400 than the second roller 404 but, in other examples, the rollers may be differently positioned.

In one example, the threading module 403 is to load the first edge of the substrate towards the print engine 410 such that a first face of the substrate faces a first direction, and wherein the threading module is to load the second edge of the substrate towards the print engine such that the first face of the substrate faces a direction opposite to the first direction. The second roller 404 may be to receive a printed substrate such that the printed side of the substrate faces inwards. In this way, the threading module 403 is to load the substrate from the rollers 402, 404 automatically in a dual-sided printing operation to facilitate dual-sided printing. Facing the substrate inwards around the second roller 404 means that the printed face remains inside of the roll of substrate and, in some examples, this may preserve the print quality of the printed image. In some examples, the second roller 404 is rotatable in a first direction to receive the print media and rotatable in a second direction when the threading module 403 is to load the second edge of the substrate toward the print engine 410. Reversing the direction of rotation may feed the substrate toward the print engine 410 such that a second (non-printed) side is printed to, for example by unwinding the substrate, wound around the roller 404, whose printed side faces inwards (or toward the center of the roller 404).

The threading module 403 may comprise a roller to engage the substrate wound around the first roller 402 and/or the second roller 404. The threading module 403 may comprise a pair of rollers, one of which is to engage the first roller 402 and the other of which is to engage the second roller 404. In other words, the threading module 403 may comprise one threader to engage both rollers 402, 404 to advance the substrate from both rollers 402, 404 or may comprise separate threaders, with one being provided for each roller 402, 404. The threading module 403, or a part thereof, may be movable (e.g. passively by a user or actively, e.g. under the control of a motor) to be brought into engagement with one of the rollers to engage the substrate thereon to advance the substrate toward the print engine 410. The loader 303, 305 of the FIG. 3 examples and/or threading module 403 of the FIG. 4 example will now be described in more detail.

Figure 5B:
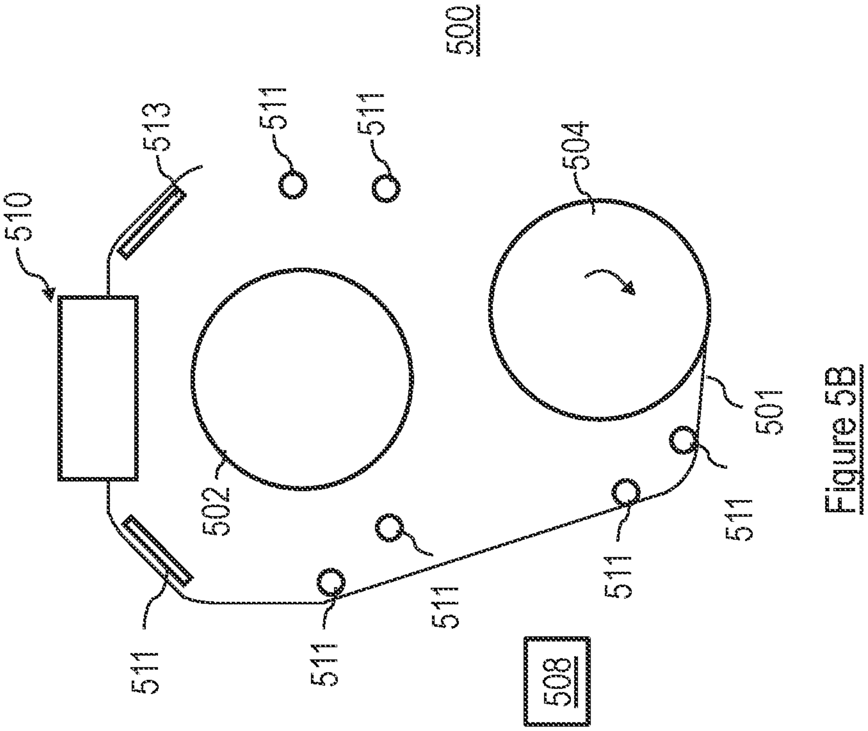
FIGS. 5*a* and 5*b* are simplified schematics of example rollers in association with a loading mechanism.
Figure 5A:
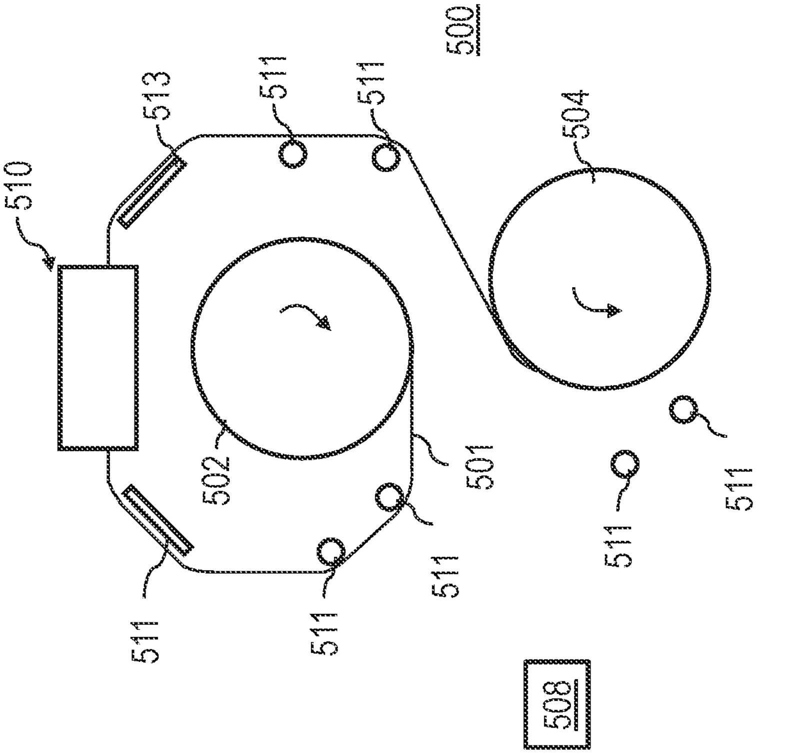
Figure 6:
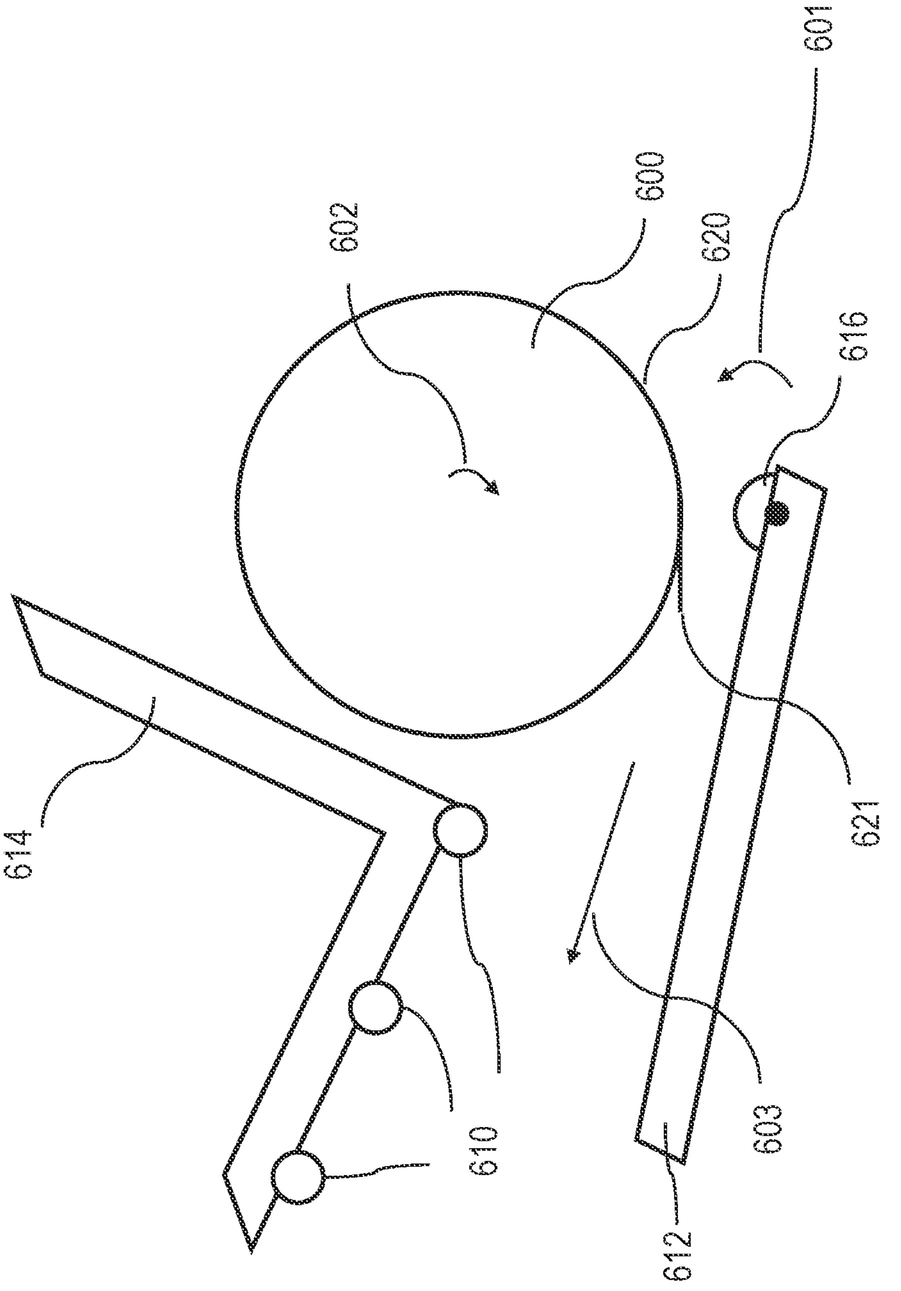
FIG. 6 is a simplified schematic of an example roller and loading mechanism.

FIGS. 5A and 5B each show example rollers and a portion of a loading mechanism. FIG. 6 shows an example loading mechanism for a roller in more detail. FIGS. 5A and 5B show the same rollers and loading mechanism at different stages of a printing process, whereas FIG. 6 shows an example loading mechanism that could be used in conjunction with the rollers of FIGS. 5A and 5B. The printing system 300 or the media handling device 400 could comprise the arrangement and components shown in FIGS. 5A, 5B, and 6, and any of the components of FIGS. 5A, 5B, and 6 may be to perform the method 100 or 200.

FIGS. 5A and 5B show first and second rollers 502, 504. The first and second rollers 302 and 304 as described above with respect to FIG. 3 and/or the first and second rollers 402, 404 as described above with respect to FIG. 4 may comprise the first and second rollers 502, 504 of the FIG. 5 example, respectively, as will now be described. Each roller 502, 504 is to retain a substrate 501 (e.g. wound therearound, e.g. for transport and/or storage) and each roller 502, 504 is to advance the substrate 501, e.g. toward or along a print media path, e.g. toward a print engine. In FIGS. 5A and 5B the print engine is indicated schematically at 510.

In FIG. 5A, the first roller 502 has a substrate 501 wound therearound and has been caused to rotate (e.g. in the direction of the arrow) to advance the substrate 501 on a media path toward the print engine 510, and through the print engine 510 where an image is printed thereon. Thereafter, the substrate 501 is advanced toward the second roller 504 which is rotatable (e.g. in the direction of the arrow which, in this example, is an opposite rotational direction to the direction of rotation of the first roller 502) to receive the substrate 501 therearound. In other words, the second roller 504 is rotatable to receive the printed substrate 501 (having an image printed thereon by the print engine 510) such that the printed substrate 501 is wound around the second roller 504.

In FIG. 5B, the substrate 501 has been advanced from the first roller 502 and has had an image printed thereon by the print engine 510, and has been wound around the second roller 504. In FIG. 5B, the second roller 504 has the printed substrate 501 wound therearound and has been caused to rotate (e.g. in the direction of the arrow) to advance the printed substrate 501 on a media path toward the print engine 510, and through the print engine 510 where an image is printed thereon. Thereafter, the printed substrate 501 may be (not shown) received at, and wound around, the first roller 502 to store the double-printed substrate. As described above, in examples of dual-sided printing the second roller 504 may be to receive the printed substrate with the printed face facing towards the center of the roller 504. As shown in FIG. 5B, the direction of rotation of the second roller 504 to advance the printed substrate may be the same rotational direction as the first roller 502 when the first roller 502 is to advance the substrate, and which may be opposite to the direction of the second roller 504 to receive the substrate.

Either of the rollers 502, 504 and/or the operation of loading mechanism may be controlled by a motor or controller, which is schematically indicated at 508. Controller 508 may be to cause the depicted components to perform any of the blocks of the methods described above with reference to FIG. 1 or 2. Schematically indicated at 511 are media guides to guide the substrate 501 from either one of the rollers on the media path. Schematically indicated at 513 is an output media guide that may be to guide the printed substrate to be cut and/or stored (e.g. cut and stored in a basket) and/or transported or that may be to guide the printed substrate back toward one of the rollers (e.g. toward the second roller 504 in the part of the process depicted in FIG. 5A and toward the first roller 502 after the subsequent printing depicted in FIG. 5B). The loading mechanism may comprise a media guide, e.g. a roller to guide a print media, and may comprise any of the components schematically indicated by 511.

FIG. 6 shows an example roller 600. The roller 600 may comprise any of the first and/or second rollers as described above in any of the previous example (e.g. any of the first rollers 302, 402, 502 and/or any of the second rollers 304, 404, 504). FIG. 6 shows a first arm 612 and a second arm 614. The first arm 612 comprises a roller 616 to engage the roller 600 and/or any print media or substrate deposited thereon (e.g. wound therearound). The first arm 612 may be movable (e.g. in the direction of the arrow 601) toward and away from the center of the roller 600. The first arm 612 may be biased toward the center of the roller (e.g. by virtue of a, not-shown, spring) to put pressure on the roller 600 or any substrate wound therearound. The arm 612 may be freely movable. The arm 612 being movable in the direction of arrow 601 toward and away from the roller 600 means that the arm 612 and roller 616 (and the pressure applied thereby) is adaptable to a varying diameter of the roller 600, since the roller diameter is dependent on the amount of substrate wound therearound which is subject to change during a printing operation. The roller 616 may be a freely-rotating roller to facilitate the movement of substrate thereby or may be a driven roller 616 (e.g. by a motor) to urge, or encourage, advancement of the substrate.

The second arm 614 also comprises a roller 610 (three of which are indicated by way of one example). The rollers 610 of FIG. 6 may comprise the rollers indicated at 511 in FIGS. 5A and 5B. The second arm 614 may be movable relative to the roller 600 or may be fixed. The roller, or rollers 610, of the second arm 614 may be to guide any media, being advanced from the roller 600, onto the media path (as indicated by arrow 610). As part of an operation to feed a substrate 620 wound around the roller 600 toward a print engine the roller 600 may be caused to rotate (e.g. as indicated by the arrow 602) which will cause a substrate 620 wound therearound to advance away from the roller 600. More specifically, when the roller 600 has rotated enough a leading edge 621 of the substrate 620 will advance proximate the first and second arms 612, 614, and advance along a path in par defined by the second arm 614 where the rollers 610 will guide the substrate along the media path, as indicated by arrow 603. Over the course of a print operation, and as more substrate advances from the roller 600, the diameter of the roller 600 having the substrate 620 therearound will decrease, however the bias of the first arm 612 can force the roller 616 into contact with the roller 600 regardless of the amount of substrate 620 that remains on the roller 600.

Therefore, the first arm 612 and/or second arm 614 provide a media arc that guides a substrate from a roller 600 toward the printing station by advancing the substrate on a media path. Put another way, the first arm 612 and/or second arm 614 define an adaptive media path, in that the substrate can be guided toward a print engine as it is advanced from a roller 600 and as the diameter of substrate around the roller 600 decreases.

The second arm 614 may be termed an inner arm having regard to its orientation relative to the first arm 612. FIG. 6 shows a side view of a roller 600 and arms 612, 614. The geometry of the roller 600 is approximately cylindrical to accommodate a planar print media therearound. FIG. 6 may therefore be regarded as a cross-section through a section of a media handling device (e.g. 400) or a printing system (e.g. 300). Therefore, associated with any roller 600 (such as any of the first or second rollers as described above with respect to other figures) may be a set of first arms (such as 612) and a set of second arms (such as 614), with each set of arms being disposed about the roller 600 along a length of the roller 600 (into the page relative to FIG. 6). In this way, each roller 600 may be associated with first and second sets of arms, each arm in the first set being of the type of the first arm 612 that exerts a force (e.g. a pressing force) against the roller 600 to adapt to the roller diameter and to apply pressure thereon (and which may be spring-loaded to be biased toward the roller center), and a second set of arms, each arm in the second set being of the type of the second arm 61 having a freely-rotating roller or a set of freely-rotating rollers (e.g. roller 610), e.g. provided at a bottom of the arm. The arm(s) 614 may provide a counterweight in examples where they are not movable (e.g. toward or away from) relative to the media like the arm(s) 612.

As stated above, the components of the FIG. 6 example may be used in conjunction with the printing system 300 or media handling device 400. For example, any of the first and/or second rollers 302, 304 of the printing system 300 may comprise the roller 600 and any of the first and/or second loaders 303, 305 may comprise the arm 612 and roller 616 and/or the arm 614 and roller(s) 610. In other words, each one of the loaders 303, 305 may comprise an arm such as 612 or 614 to engage a roller and to advance the substrate on the media path. Any of the first and/or second rollers 402, 404 of the media handling device 400 may comprise the roller 600 and the threading module 403 may comprise the arm 612 and roller 616 and/or the arm 614 and roller(s) 610. The threading module 403 may comprise two sets of arms 612 or 614, with one set for each roller, or may comprise one set which is movable between the first roller 402 to engage the first roller 402 when the first roller 402 is used as the input roller for a print operation, and the second roller 404 to engage the second roller 404 when the second roller 404 is used as the input roller for a print operation (e.g. to print an image to an other side of the substrate).

The examples herein relate to an automatic process for printing a subsequent image to a single substrate, for example to build up an image on a single side of the substrate or as part of a dual-sided printing operation where a further image is printed to a second side of the substrate. As part of the automatic process, the printed substrate can be wound around a second roller which can then start unloading and advancing the printed substrate to the print engine again, thereby a subsequent printing operation can be performed without user intervention. Thereby, the time for a user to process the printed substrate, e.g. to remove it from and re-load it into the printing system, is eliminated. Either one of the two rollers can be used as an input roller to advance a substrate toward a print engine, or as an output roller to collect a printed substrate from the print engine, and therefore the examples herein provide flexibility.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

unwinding a print media from an input roller immediately toward an input of a printing station, wherein the printing station comprises the input and an output;

winding printed print media from an output of the printing station immediately onto an output roller;

unwinding the printed print media from the output roller immediately toward the input of the printing station; and winding the printed print media around the input roller.

2. The method of claim 1, comprising:

unwinding the print media, having first and second opposite sides, from the input roller immediately toward the input of the printing station;

printing a first image onto the first side of the print media at the printing station;

winding the printed print media from the output of the print engine immediately onto the output roller;

unwinding the printed print media from the output roller immediately toward the input of the printing station; and printing a second image onto the second side of the print media at the printing station.

3. The method of claim 2, wherein winding the printed print media from the output of the print engine directly onto the output roller comprises:

winding the printed print media onto the output roller such that the first side of the print media faces toward from the center of the output roller and the second side of the print media faces away from the center of the output roller.

4. The method of claim 1, wherein winding the printed print media from an output of the printing station immediately onto the output roller comprises rotating the output roller in a first direction, and wherein unwinding the printed print media from the output roller immediately toward the input of the printing station comprises rotating the output roller in a second direction.

5. A printing system comprising:

a first roller to receive a print media;

a first loader to load a first edge of the print media from the first roller into a print path to advance the print media along the print path immediately toward an input of a print engine;

a second roller to receive print media immediately from an output of the print engine; and a second loader to load a second edge of the print media from the second roller into the print path to advance the print media along the print path immediately toward the input of the print engine and, subsequently, toward the first roller for winding the printed print media around the input roller.

6. The printing system of claim 5, wherein the first and second rollers are rotatable, and wherein the second roller is rotatable in two opposing directions.

7. The printing system of claim 6, wherein the second roller is rotatable in a first direction to receive print media from the output of the print engine, and in a second direction to load the second edge of the print media into the print path immediately toward the input of the print engine.

8. The printing system of claim 5, wherein the print media comprises first and second opposing sides, and wherein the first loader is to load the first edge into the print path such that the first side of the print media faces a first direction, and wherein the second loader is to load the second edge into the print path such that the second side of the print media faces the first direction.

9. The printing system of claim 5, wherein the second roller is to receive print media, having printing fluid deposited thereon, such that the printed side of the print media faces toward the center of the second roller.

10. The printing system of claim 5, wherein the first and second loaders each comprise a roller to contact the print media to advance the print media.

11. A media handling device comprising:

first and second rollers provided on the same side of the media handing device;

each of the first and second rollers to receive a substrate, wherein the second roller is to receive a substrate from the first roller; and a threading module to load an edge of the substrate disposed on the first and second rollers immediately toward an input of a print engine, wherein the threading module is to load a first edge of the substrate from the first roller toward the print engine, and a second, opposite, edge of the substrate from the second roller immediately toward the input of the print engine and, subsequently, toward the first roller for winding the substrate, starting with the first edge, around the first roller.

12. The media handling device of claim 11, wherein the threading module is to load the first edge of the substrate immediately towards the input of the print engine such that a first face of the substrate faces upwards, and wherein the threading module is to load the second edge of the substrate immediately towards the input of the print engine such that the first face of the substrate faces downwards.

13. The media handling device of claim 11, wherein the second roller is to receive a printed substrate such that the printed side of the substrate faces inwards.

14. The media handling device of claim 11, wherein the second roller is rotatable in a first direction to receive the print media and wherein the second roller is rotatable in a second direction when the threading module is to load the second edge of the substrate immediately toward the input of the print engine.

* * * * *